UNITED STATES PATENT OFFICE.

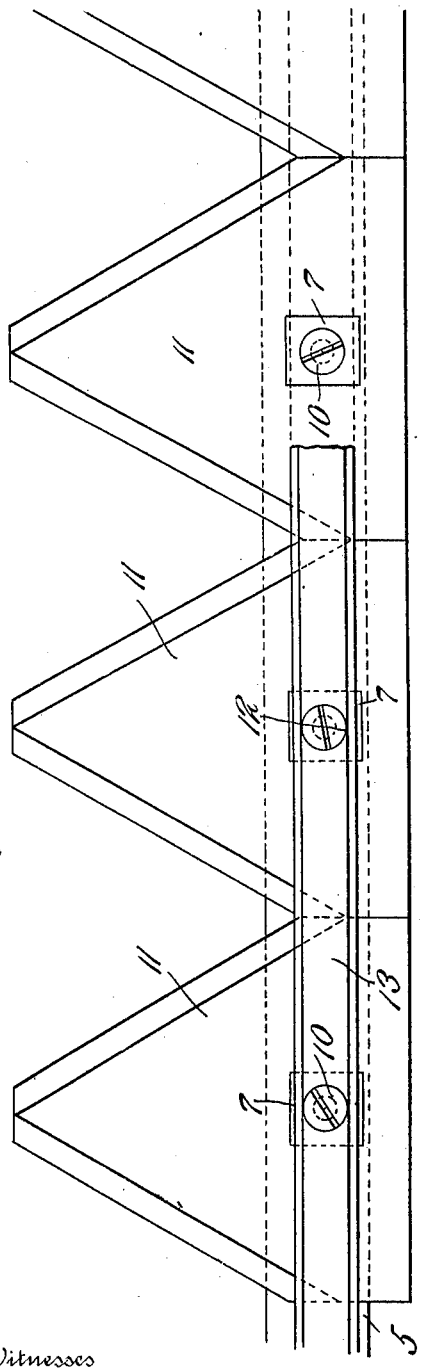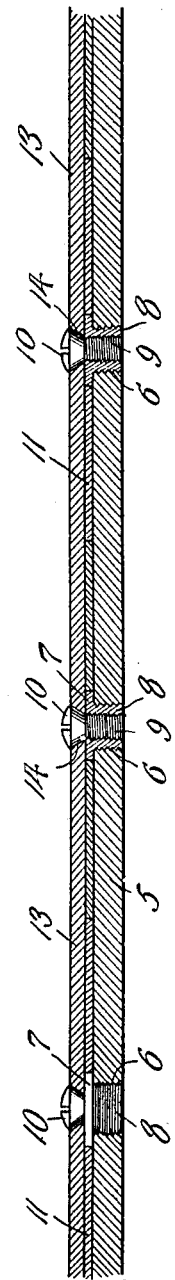

CHARLES W. CARSON, OF ST. JOSEPH, MISSOURI.

CUTTING APPARATUS.

984,349.  Specification of Letters Patent.  Patented Feb. 14, 1911.

Application filed January 8, 1910. Serial No. 537,040.

*To all whom it may concern:*

Be it known that I, CHARLES W. CARSON, a citizen of the United States, residing at St. Joseph, in the county of Buchanan and State of Missouri, have invented new and useful Improvements in Cutting Apparatus, of which the following is a specification.

This invention relates to cutting apparatus for mowing machines and harvesters, and it has particular reference to the cutter bar and to the means for securing the knives or blades upon the same.

In order to render the attachment of the blades upon the cutter bar perfectly secure it has been customary to construct a cutter bar with projections or bosses of a non-circular shape to engage apertures in the blades; the latter being afterward attached by means of screws or bolts extending through a top bar or strap. This construction, while quite effective, is open to the objection that the manufacture of the cutter bar with the bosses or projections has been difficult and expensive, it being necessary to roll the same and to provide rolls and machinery of special construction.

The present invention has for its prime object to construct a cutter bar having blocks or projections applied thereto, said cutter bar consisting of a plain strap of steel which may be readily drilled and threaded for the application of the blocks or projections.

A further object of the invention is to simplify and improve the general construction, operation and assemblage of the parts constituting the improved device.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the invention may be resorted to when desired.

In the drawing,—Figure 1 is a top plan view of a portion of a cutter bar constructed in accordance with the invention and having the blades applied thereto. Fig. 2 is a longitudinal sectional elevation of the same.

Corresponding parts in the several figures are denoted by like characters of reference.

The cutter bar 5 consists of a plain bar of steel, rectangular in cross section and of suitable dimensions, said bar being drilled or bored at intervals to form apertures 6 which are internally threaded, as shown.

Blocks 7, which may be of any suitable dimensions and of non-circular shape, being preferably rectangular, as shown, are provided, said blocks being equipped with downwardly extending externally threaded lugs 8 adapted to engage the threaded apertures 6. The blocks and lugs are provided with apertures 9 extending vertically therethrough, said apertures being threaded reversely to the apertures 6 for the reception of screws or bolts 10.

The knives or blade 11 are each provided with a non-circular opening 12 adapted to engage one of the blocks 7, and a top bar or strap 13 is provided, said top bar being provided with countersunk openings 14 for the reception of the heads of the fastening screws or bolts.

The operation and advantages of this invention will be readily understood from the foregoing description taken in connection with the drawing hereto annexed by those skilled in the art to which it appertains. By applying the blocks or projecting members to the cutter bar in the manner herein described the cost of manufacture is greatly reduced, while the said blocks constitute means for the firm attachment of the blades, the latter being finally secured by means of the top bar or strap 13 and the fastening screws or bolts 10, the latter engaging the internally threaded apertures of the blocks and the lugs projecting therefrom. By having the screws and the lugs reversely threaded, the liability of their working loose or becoming accidentally detached is greatly reduced.

Having thus described the invention, what is claimed as new, is:—

1. A cutter bar, blocks detachably connected therewith, blades having block-engaging apertures, and fastening means including screws having threaded engagement with the blocks.

2. A cutter bar, blocks having threaded engagement therewith, blades having block engaging apertures, and fastening means including a strap and screws having threaded engagement with the blocks.

3. A cutter bar having threaded apertures, blocks having threaded lugs engaging said apertures, blades having block-engaging apertures, a top bar, and fastening screws extending through the top bar into the blocks and the lugs projecting from the latter.

4. A cutter bar having threaded apertures, blocks having threaded lugs engaging the apertures, said blocks being provided with apertures extending through the lugs and threaded reversely to the apertures in the cutter bar, blades having block-engaging apertures, a top bar having openings, and fastening screws extending through said openings and engaging the threaded apertures of the blocks and the lugs extending therefrom.

In testimony whereof I affix my signature in presence of two witnesses.

CHARLES W. CARSON.

Witnesses:
ESTHER EBERHARDT,
FRED M. WANGER.